(No Model.)

F. C. ROCKWELL.
BICYCLE HANDLE BAR.

No. 570,187. Patented Oct. 27, 1896.

Witnesses:
C. E. Buckland.
E. J. Hyde.

Inventor:
Frederick C. Rockwell,
by Harry R. Williams
atty.

THE NORRIS PETERS CO., PHOTO-LITHO., WASHINGTON, D. C.

UNITED STATES PATENT OFFICE.

FREDERICK C. ROCKWELL, OF HARTFORD, CONNECTICUT.

BICYCLE HANDLE-BAR.

SPECIFICATION forming part of Letters Patent No. 570,187, dated October 27, 1896.

Application filed June 9, 1896. Serial No. 594,850. (No model.)

*To all whom it may concern:*

Be it known that I, FREDERICK C. ROCKWELL, a citizen of the United States, residing at Hartford, in the county of Hartford and State of Connecticut, have invented certain new and useful Improvements in Bicycle Handle-Bars, of which the following is a specification.

The invention relates to the class of handle-bars that are provided for bicycles, tricycles, and the like vehicles that are steered by the hand of the rider.

The object of the invention is to construct a cheap and attractive steering-bar that is very strong and durable, is light in weight, and somewhat elastic and yielding, so that it will relieve the arms of the rider of a portion of the vibrations incident to riding, and will spring and not break or be permanently bent if suddenly caused to make forcible contact with any other object, that is impervious to moisture and unaffected by weather, and that has a soft and very comfortable gripping-surface for the hands of the rider along its entire length.

To this end the invention resides in a steering-bar consisting of a core formed to shape with an outer covering, wearing, or gripping surface of compressed waterproofed particles of cork, as more particularly hereinafter described, and pointed out in the claims.

Figure 1:
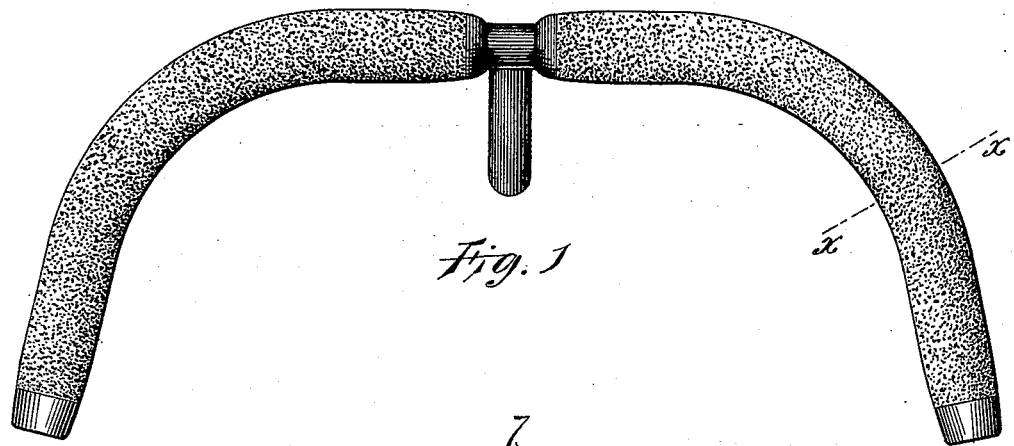
Figure 2:
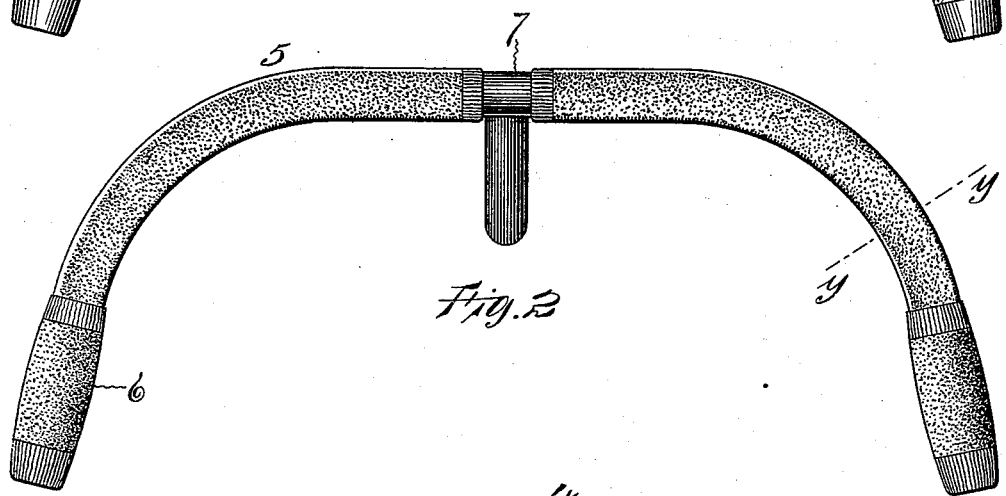
Figures 3, 4:
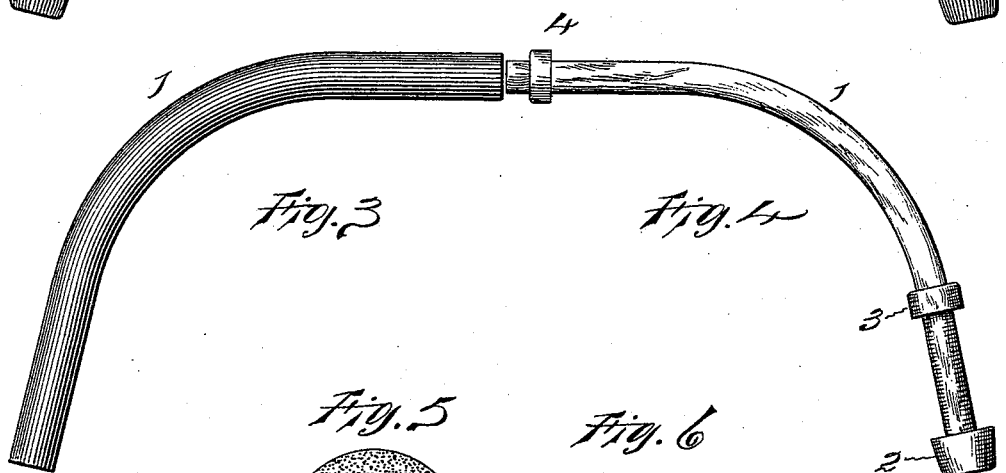
Figures 5, 6:

In the accompanying drawings, wherein the invention is illustrated, Figure 1 is a view of a steering-bar constructed according to the invention. Fig. 2 is a view of a modified shape of the same. Fig. 3 is a view of a part of the core used in the construction of the bar shown in Fig. 1. Fig. 4 is a view of a part of the core used in the construction of the bar shown in Fig. 2. Fig. 5 is an enlarged cross-sectional view taken on line X X of Fig. 1. Fig. 6 is an enlarged cross-sectional view taken on line Y Y of Fig. 2.

In the views, 1 indicates the core, which may be made of solid or tubular metal or any light strong wood, as hickory or elm. The core is given any desirable shape in cross-section, either round for its entire length, as shown in Fig. 3, or round for a portion of its length and square for the remainder, as the core shown in Fig. 4, and when made of wood it may be turned down in such manner as to leave tips 2 at the ends with collars 3 for the upper boundaries of the sections of the bar usually provided for the hands and collars 4 near the steering-head, as shown in Fig. 4, but of course it may be turned approximately the same size throughout its entire length with possibly a small swell near each end, where the usual grips are placed. After having been formed, turned, or worked down to its proper shape in cross-section the core is bent and set to any desired curve by the ordinary processes. If the core is wood, it may be set by steaming, and if metal it may be formed by bending-rolls to the desired curve.

Upon the core is put the covering or wearing-surface. This wearing-surface is formed of compressed waterproofed particles of ground or broken cork. Particles of ground or broken cork can be mixed or sprayed with liquid shellac until they become thoroughly coated. After these gum-coated particles, which are now somewhat waterproof, are dried they can be placed in suitably-shaped molds, in which the core has been placed, and there subjected to heat and pressure to compact and set them securely in place around the core. The entire core may be placed in a mold, so as to produce a bar similar to that shown in Fig. 1, or only the upper portion 5 may be placed in the molds and then covered by the heated and compressed particles of cork. In case only the upper part of the core is placed in the molds the usual grip-sections 6 may be covered with handles of the same material made separately and then put on and secured in place.

After the waterproofed particles of cork are pressed and secured in place on the core and the gum or cement is thoroughly hardened and set this skin or wearing-surface can be sandpapered or turned down to give the final finish, and then the sections of the core, if made in two parts, can be clasped together by the ordinary metallic head 7, by means of which it is secured to the steering-head of the machine with which the bar is to be used.

A bar formed in this manner is light, cheap, and strong. The core is light in weight, as is the exterior wearing-surface, and both are cheap and easily worked and bent. If the core is of wood, it may, while strong, be slightly yielding, so that some of the vibration incident to the riding is taken up to the relief of the arms of a rider, and such a bar is not liable to crack off if it receives more than normally hard usage or a sudden blow, such as would result in a collision or by a fall of the machine to the ground. The bar can be made stylish in appearance, for it can be given an attractive shape and a high finish. Portions can be square or hexagonal and portions can be round, if desired, and the whole completed to any artistic curve. The ordinary tips, which are easily damaged, are not necessary for the wooden core, if used, and can be turned to leave collars which will answer the purposes of tips, and the hand-sections can, if desired, for the sake of ornament, be separated from the remainder of the bar by leaving the collars of wood above mentioned. These wooden tips and wooden collars add to the effect of the finish and they harmonize with the effect of the wooden rims of many of the machines now being made. With the metal core no tips need be used, for the whole exterior surface may be covered and protected with the gripping-surface of compressed waterproofed particles of cork which are not affected by weather and are not marred by ordinary blows or bruises. If the exterior surface of this material becomes slightly soiled or damaged, it can be sandpapered off or cleaned in a very simple manner. The exterior skin or covering so thoroughly protects a wooden core from weather that the wood has no tendency to check or split and it removes all liability of the wood warping out of its given shape under atmospheric influences, and it protects a metallic core from rusting. A handle-bar formed in this manner, besides being neat and attractive, light, strong, and durable, is very satisfactory in use, for it can be grasped with equal comfort at any portion of its length, thus allowing the rider to change the location of his hands with a consequent change of position of the arms and back without requiring him to grasp a metallic part. A bar made in this way does not have a dazzling reflection, such as oftentimes results to the inconvenience of the rider with the polished nickel bar now in use, the superior gripping-surface provided for the entire length of the bar having a soft velvety dead finish.

I claim as my invention—

1. As a new article of manufacture, a curved steering-bar for bicycles consisting of a stiff inner core formed to shape with its entire exterior surface composed of particles of cork and a binder united in a homogeneous mass by heat and pressure, substantially as specified.

2. As a new article of manufacture, a curved steering-bar for bicycles consisting of a core of wood of suitable cross-sectional outline formed to shape with its entire exterior surface composed of waterproofed particles of cork united by heat and pressure, substantially as specified.

FREDERICK C. ROCKWELL.

Witnesses:
H. R. WILLIAMS,
E. J. HYDE.